United States

Cox et al.

[11] 3,877,792

[45] Apr. 15, 1975

[54] SHORT FOCAL LENGTH, LARGE APERTURE OPTICAL SYSTEM

[75] Inventors: Arthur Cox, Park Ridge; Walter J. Johnson, Mundelein, both of Ill.

[73] Assignee: Bell & Howell Company, Chicago, Ill.

[22] Filed: Apr. 12, 1974

[21] Appl. No.: 460,402

[52] U.S. Cl............. 350/189; 350/175 NG; 350/225
[51] Int. Cl......................... G02b 3/04; G02b 9/12
[58] Field of Search.............. 350/225, 189, 175 NG

[56] References Cited
FOREIGN PATENTS OR APPLICATIONS
489,381    7/1938    United Kingdom................ 350/225

*Primary Examiner*—Paul A. Sacher
*Attorney, Agent, or Firm*—John E. Peele, Jr.

[57] ABSTRACT

This invention relates to a short focal length, large aperture optical system primarily designed to efficiently transmit light rays to an image plane with an extraordinarily high degree of correction over the prescribed field.

2 Claims, 3 Drawing Figures

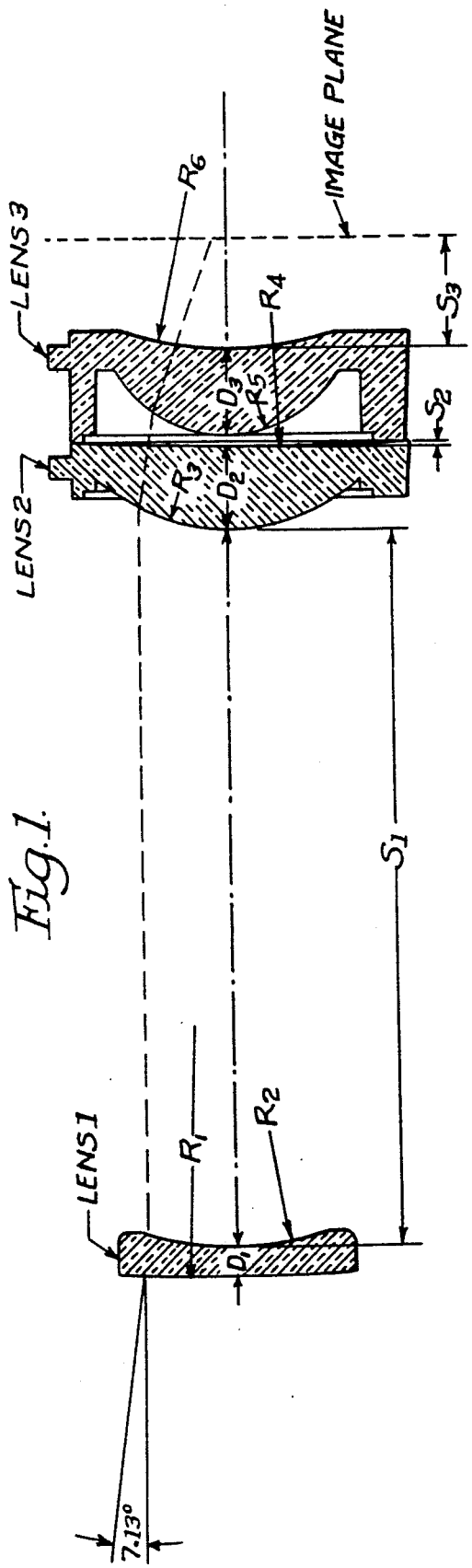

SHORT FOCAL LENGTH, LARGE APERTURE OPTICAL SYSTEM

This invention relates to a short focal length, large aperture optical system primarily intended for use in an optical instrument.

An optical system has been designed to efficiently transmit light rays to an image plane with an extraordinarily high degree of correction over the prescribed field. The optical system is of short focal length and high aperture to efficiently transmit collimated light rays of a predetermined wavelength from a source of small size and to image the rays without degradation of an image plane at a smaller size than that of the source, in this instance, a laser. Because the optical system is intended for use in a mass-produced instrument, such as a video disc recorder-player, simplicity of design, ease of assembly, and low cost were desired as well. To accomplish these desired results, the optical system is designed with plastic elements which make the use of aspheric surfaces economically feasible. The resulting optical system is relatively light weight and relatively low cost in comparison with a comparable all-glass optical system, which probably would require several more elements using more expensive rare earth glasses. The aspheric surfaces enable the system to be diffraction limited over the prescribed field thereby providing an image of substantially better correction than would be anticipated for an all-glass system of greater complexity, weight and cost. Further, the design was selected so that the desired performance characteristics can be maintained notwithstanding anticipated tolerance variations during manufacture and assembly.

An object of the invention is to provide a short focal length, high aperture optical system for efficient transmission of light rays of a predetermined wavelength from a light source of limited diameter and to image the rays without degradation of an image plane at a similar size than that of the source.

Other objects and advantages of the invention will become apparent from the detailed description which follows when taken in conjunction with the accompanying drawings in which:

FIG. 1 is a sectional view of an optical system embodying the present invention;

FIG. 2 is a table of optical values for the optical system of FIG. 1, and

FIG. 3 is a substitute table of optical values for the first element of the optical system of FIG. 1, the remaining elements being identical with those of FIG. 2.

Referring to the drawings, an optical system is shown for critically imaging light rays from a light source having a limited diameter and essentially a single wavelength. In this preferred embodiment, the light source is a laser having an 0.8 mm diameter beam and a wavelength of 6328 Angstroms. The arrangement of elements, configured as hereinafter described, provides for critically imaging the collimated beam to a point source of extremely small diameter. By manufacture of the elements primarily of plastic, enabling molding of aspheric surfaces and surfaces having smaller than usual radii, a lightweight, highly corrected optical system can be economically manufactured.

The optical system shown in FIG. 1 has three elements preferably molded of plastic, such as acrylic and particularly of polymethylmethacrylate, although the first element $L_1$ to the left in FIG. 1 may be of glass. This first element, positioned nearest a light source such as a laser (not shown), has an approximately 1 inch or 25 mm focal length and is negative in power. This negative element receives the collimated rays of the laser and forms a virtual point image of the light beam. The beam is slightly diverged upon exiting this first element.

The second element $L_2$ is axially separated from the first element by approximately 6¼ inches or 159 mm, a relatively wide distance. This second lens is of somewhat larger diameter than the first element to ensure impingement of substantially all light rays exiting therefrom onto the second element notwithstanding some slight misalignment between the optical axes of the elements which might occur during assembly.

The third element $L_3$ is a similar diameter to the second element, and is positioned adjacent thereto. Together, these latter two elements from a positive power component group functioning as a finite conjugate lens objective with a magnification of one twenty-fifth. This positive component group relays the laser beam light rays and forms a reduced real image of the virtual image formed by the negative element.

The three element system functions as a 0.04 inch focal length objective having an effective aperture of $f/1.25$ (NA = 0.4), and being diffraction limited over the prescribed field. The combined high degree of correction and effective large aperture speed are enabled by using an aspheric surface in the positive component group of the system. The aspheric element causes the positive component group to be diffraction limited over an approximately 14° field amounting to a 7° half angle. Hence, slight misalignment of the optical system with respect to the light source is compensated for.

The optical values of the optical system of FIG. 1 are as follows:

TABLE I

EFL = .040 inches

| Lens | Radii(in.) | Thickness(in.) | Spacings(in.) |
|---|---|---|---|
| $L_1$ | $R_1 = 4.4378$ | $D_1 = .040$ | |
| | $R_2 = -.4386$ | | |
| | | | $S_1 = 6.275$ |
| $L_2$ | $R_3 = .2734$ | $D_2 = .120$ | |
| | $*R_4 = -4$ | | |
| | | | $S_2 = .005$ |
| $L_3$ | $R_5 = .1735$ | $D_3 = .125$ | |
| | $R_6 = -.4793$ | | |
| | | | $S_3 = .153$ BFL |

In the above table, the first column lists the lens elements numerically starting at the ray entrance side of the system being formed, for example, by molding from plastic, such as polymethylmethacrylate. Each of the elements has the same dispersive index and refractive index, i.e. $V = 57.4$ and $N_D = 1.4917$ and $N(6328 A) = 1.4898$. The second column lists the respective radii and the wertex radius of the aspheric surface $*R_4$, and wherein said aspheric surface is obtained from the formula $$Z = \frac{K(H^2 - Z_0^2) + 2(AH^4 + BH^6 + CH^8 + DH^{10})}{2(1 - KZ_0)}$$

$K = -0.250000$ $A = -0.95105 \times 10^1$ $B = -0.22000 \times 10^2$
$C = 0$
$D = 0$ where $1/K$ is the vertex radius of curvature of the surface of the element; H is the Cartesian coordinate of a point on the surface referred in a vertical axis; Z is the Cartesian coordinate of a point on the surface referred in a horizontal axis. The third column lists the thickness of the respective elements. The fourth column lists the axial spacings between the respective elements and the nominal image plane. Element 1 has an effective focal length $= -0.9993$ in., element $2 = 0.5928$ in., and element $3 = 0.4895$ in.

In the alternative embodiment with element 1 of glass, and elements 2 and 3 the same as set forth in Table 1

| | | |
|---|---|---|
| $L_1$ | $R_1 = 4.3250$ | $D_1 = .040$ |
| | $R_2 = -.4435$ | |

The dispersive index or abbe number V is 67.0 and the index of refraction $N_D$ is 1.49776 and $N(6328 A)$ is 1.4963. The effective focal length $= -0.9991$ in.

What is claimed is:

1. An optical system of relatively short focal length and large aperture having substantially the following specification:

TABLE 1

| Lens | Radii(in.) | Thickness(in.) | Spacings(in.) |
|---|---|---|---|
| $L_1$ | $R_1 = 4.4378$ | $D_1 = .040$ | |
| | $R_2 = -.4386$ | | |
| | | | $S_1 = 6.275$ |
| $L_2$ | $R_3 = .2734$ | $D_2 = .120$ | |
| | *$R_4 = -4$ | | |
| | | | $S_2 = .005$ |
| $L_3$ | $R_5 = .1735$ | $D_3 = .125$ | |
| | $R_6 = -.4793$ | | |
| | | | $S_3 = .153$ BFL |

ALL LENSES: $V = 57.4$  $N_D = 1.4917$ wherein the first column lists the lens elements numerically starting at the ray entrance side of the system which elements each have the same dispersive index and refractive index; the second column lists the respective radii and vertex radius of the aspheric surface *$R_4$, the third column lists the thickness $D_1$ to $D_3$ of the respective elements; and the fourth column lists the axial spacings $S_1$ to $S_3$ between the respective elements, and the image plane.

2. An optical system of relatively short focal length and large aperture having substantially the following specification:

| Lens | Radii (in.) | Thickness (in.) | Spacings (in.) | V | $N_D$ |
|---|---|---|---|---|---|
| $L_1$ | $R_1 = 4.3250$ | $D_1 = .040$ | | 67.0 | 1.49776 |
| | $R_2 = -.4435$ | | | | |
| | | | $S_1 = 6.270$ | | |
| $L_2$ | $R_3 = .2734$ | $D_2 = .120$ | | 57.4 | 1.4917 |
| | *$R_4 = -4$ | | | | |
| | | | $S_2 = .005$ | | |
| $L_3$ | $R_5 = .1735$ | $D_3 = .125$ | | 57.4 | 1.4917 |
| | $R_6 = -.4793$ | | | | |
| | | | $S_3 = .153$ BFL | | | wherein the first column lists the lens elements numerically starting at the ray entrance side of the system; the second column lists the respective radii and vertex radius of the aspheric surface *$R_4$, the — values of the radii indicate surfaces which are concave; the third column lists the thickness $D_1$ to $D_3$ of the respective elements; the fourth column lists the axial spacings $S_1$ to $S_3$ between the respective elements and the image plane; the fifth column lists the abbe number V, the sixth column lists the index of refraction of the elements.

* * * * *